United States Patent
Akimoto et al.

(10) Patent No.: US 11,003,975 B2
(45) Date of Patent: May 11, 2021

(54) CARD-TYPE ELECTRONIC DEVICE CAPABLE OF SUPPRESSING RISE IN TEMPERATURE, SLOT, AND ELECTRONIC APPARATUS

(71) Applicant: CANON KABUSHIKI KAISHA, Tokyo (JP)

(72) Inventors: Takahiro Akimoto, Kawasaki (JP); Tatsuya Hanayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 16/092,289

(22) PCT Filed: Mar. 30, 2017

(86) PCT No.: PCT/JP2017/014301
§ 371 (c)(1),
(2) Date: Oct. 9, 2018

(87) PCT Pub. No.: WO2017/179475
PCT Pub. Date: Oct. 19, 2017

(65) Prior Publication Data
US 2020/0349409 A1    Nov. 5, 2020

(30) Foreign Application Priority Data
Apr. 14, 2016    (JP) .............................. JP2016-081058

(51) Int. Cl.
*G06K 19/077*    (2006.01)
*G06K 7/00*    (2006.01)

(52) U.S. Cl.
CPC ....... *G06K 19/0773* (2013.01); *G06K 7/0026* (2013.01); *G06K 19/07732* (2013.01)

(58) Field of Classification Search
CPC .......... H05K 7/20772; H05K 7/20636; H05K 7/2039; H05K 7/20336; H01R 12/7005;
(Continued)

(56) References Cited

U.S. PATENT DOCUMENTS

| 2008/0212277 A1 | 9/2008 | Aoto et al. |
| 2013/0109201 A1* | 5/2013 | Wu ...................... H01R 12/721 439/59 |
| 2013/0194747 A1* | 8/2013 | Nagasawa .......... H05K 7/20336 361/690 |

FOREIGN PATENT DOCUMENTS

| JP | 2000150027 A | 5/2000 |
| JP | 2012195525 A | 10/2012 |
| JP | 5334119 B2 * | 11/2013 ............. G06F 1/203 |

OTHER PUBLICATIONS

International Search Report issued in Intl. Appln. No. PCT/JP2017/014301 dated Jul. 21, 2017.
(Continued)

*Primary Examiner* — Thien M Lee
*Assistant Examiner* — Tae W Kim
(74) *Attorney, Agent, or Firm* — Rossi, Kimms & McDowell LLP

(57) ABSTRACT

A card-type electronic device capable of suppressing a rise in the temperature of signal lines for high-speed communication requiring impedance control while ensuring sufficient thermal connection and electrical connection. A connector is fixed to a substrate on which electronic components that generate heat are mounted, and includes electrical contacts electrically connected to an external apparatus and a thermal contact thermally connected to the external apparatus. A cutout is formed in the substrate between a portion to which the thermal contact is fixed and a portion to which the electrical contacts are fixed.

9 Claims, 8 Drawing Sheets

(58) Field of Classification Search
CPC ....... H01R 12/721; G06F 1/203; G06F 1/206;
G06K 19/0773; G06K 7/0026; G06K 19/07732
USPC .......................................................... 235/492
See application file for complete search history.

(56) References Cited

OTHER PUBLICATIONS

Written Opinion issued in Intl. Appln. No. PCT/JP2017/014301 dated Jul. 21, 2017.

* cited by examiner

CARD-TYPE ELECTRONIC DEVICE CAPABLE OF SUPPRESSING RISE IN TEMPERATURE, SLOT, AND ELECTRONIC APPARATUS

TECHNICAL FIELD

The present invention relates to a card-type electronic device, a slot into which and from which the card-type electronic device is inserted and removed, and an electronic apparatus equipped with the slot.

BACKGROUND ART

A card-type storage device as an example of a card-type electronic device is widely used for storing various information in portable electronic apparatuses, such as a digital camera and a personal computer. Conventionally, a data transfer rate at which data is transferred when storing the same in the card-type storage device from outside or at which data stored in the card-type storage device is transferred for reading out the same is not high. Therefore, in the card-type storage device, the amount of power consumed has been small, so that the amount of heat generated has not been large. Accordingly, the heat generated in the card-type storage device is dissipated by thermal conduction via electrical contacts or natural convection within the card-type storage device, so that the generated heat causes little trouble in the card-type storage device.

In recent years, however, there is an increasing demand for a card-type storage device which is capable of writing and reading data at high speed. For example, in a case where a moving image with a high-resolution, a high-frame rate, and a high gradation (so-called 4k moving image or 8k moving image, for example) is shot in high image quality using a digital camera, the data transfer rate is dramatically increased. This requires the card-type storage device to be capable of performing stable and high-speed data transfer for a long time period, and some signals input or output by the card-type storage device require impedance control and the like of circuit board wiring.

With an increase in the data transfer rate, power consumption by semiconductor devices and the like mounted in the card-type storage device increases to increase the amount of heat generation. This causes a rise in the internal temperature of the card-type storage device, which causes a change in the impedance of the circuit board wiring, whereby signal waveform is distorted, so that there is a fear that it is impossible to perform accurate transmission and reception of signals.

To solve this problem, there have been proposed various arrangements for dissipating heat generated in the card-type storage device to the outside by heat dissipation means. For example, in PTL 1 mentioned below, there is proposed an electronic control device in which exothermic components are arranged in the vicinities of connector pins, and a conductive pattern is disposed such that heat generated by the exothermic components is conducted to the connector pins. Further, in PTL 2 mentioned below, a circuit board connector is proposed in which large-current terminal fittings, provided separately from signal terminals, are arranged with a larger spacing therebetween than between the signal terminals, and at locations outward of the signal terminals.

CITATION LIST

Patent Literature

PTL 1: Japanese Laid-Open Patent Publication (Kokai) No. 2012-195525

PTL 2: Japanese Laid-Open Patent Publication (Kokai) No. 2000-150027

SUMMARY OF INVENTION

Technical Problem

According to the technique disclosed in PTL 1, it is possible to transfer heat generated within the electronic control device to the outside via the connector pins. However, there is a fear that the transferred heat also raises the temperature of signal lines for high-speed communication that requires impedance control and the like, resulting in a change in impedance characteristics of the wiring. Further, according to the technique disclosed in PTL 2, it is possible to dissipate heat to the outside via the large-current terminal fittings, and hence heat is difficult to be transferred from the large-current terminal fittings to other signal terminals. However, there is a fear that heat is transferred to the signal terminals via a circuit board or a housing, thereby causing a rise in the temperature of the signal terminals.

Solution to Problem

The present invention provides a card-type electronic device which is capable of suppressing a rise in the temperature of signal lines for high-speed communication that requires impedance control and the like while ensuring sufficient thermal connection and electrical connection.

Accordingly, in a first aspect of the present invention, there is provided a card-type electronic device comprising a substrate on which electronic components that generate heat are mounted, and a connector fixed to the substrate, the connector including electrical contacts electrically connected to an external apparatus and a thermal contact thermally connected to the external apparatus, wherein the substrate has a cutout formed therein at a location between a portion to which the thermal contact is fixed and a portion to which the electrical contacts are fixed.

Accordingly, in a second aspect of the present invention, there is provided a slot into which and from which a card-type electronic device is inserted and removed, the card-type electronic device including a substrate on which electronic components that generate heat are mounted, and a connector fixed to the substrate, the connector including electrical contacts electrically connected to an external apparatus and a thermal contact thermally connected to the external apparatus, wherein the substrate has a cutout formed therein at a location between a portion to which the thermal contact is fixed and a portion to which the electrical contacts are fixed, the slot comprising a slot base including electrical contacts and a thermal contact connected to the electrical contacts and the thermal contact of the card-type electronic device, respectively, and a substrate to which the slot base is fixed, wherein the thermal contact of the slot base and the thermal contact of the card-type electronic device are brought into surface contact with each other, in a state in which the card-type electronic device is inserted into the slot.

Accordingly, in a third aspect of the present invention, there is provided an electronic apparatus comprising a card-type electronic device, the card-type electronic device including a substrate on which electronic components that generate heat are mounted, and a connector fixed to the substrate, the connector including electrical contacts electrically connected to an external apparatus and a thermal contact thermally connected to the external apparatus, wherein the substrate has a cutout formed therein at a location between a portion to which the thermal contact is fixed and a portion to which the electrical contacts are fixed, and a slot into which and from which the card-type electronic device is inserted and removed, and a control unit configured to control communication between the electronic apparatus and the card-type electronic device mounted in the slot.

Advantageous Effects of Invention

According to the present invention, it is possible to realize a card-type electronic device which is capable of suppressing a rise in the temperature of signal lines for high-speed communication, while ensuring sufficient thermal connection and electrical connection, thereby making it possible to perform accurate transmission and reception of signals.

Further features of the present invention will become apparent from the following description of exemplary embodiments (with reference to the attached drawings).

DESCRIPTION OF EMBODIMENTS

The present invention will now be described in detail below with reference to the accompanying drawings showing embodiments thereof. Here, as a card-type electronic device according to the present invention, a card-type storage device is described by way of example. Further, as an electronic apparatus according to the present invention, an image pickup apparatus provided with a slot into which and from which the card-type storage device can be inserted and removed is described by way of example.

Figure 1:
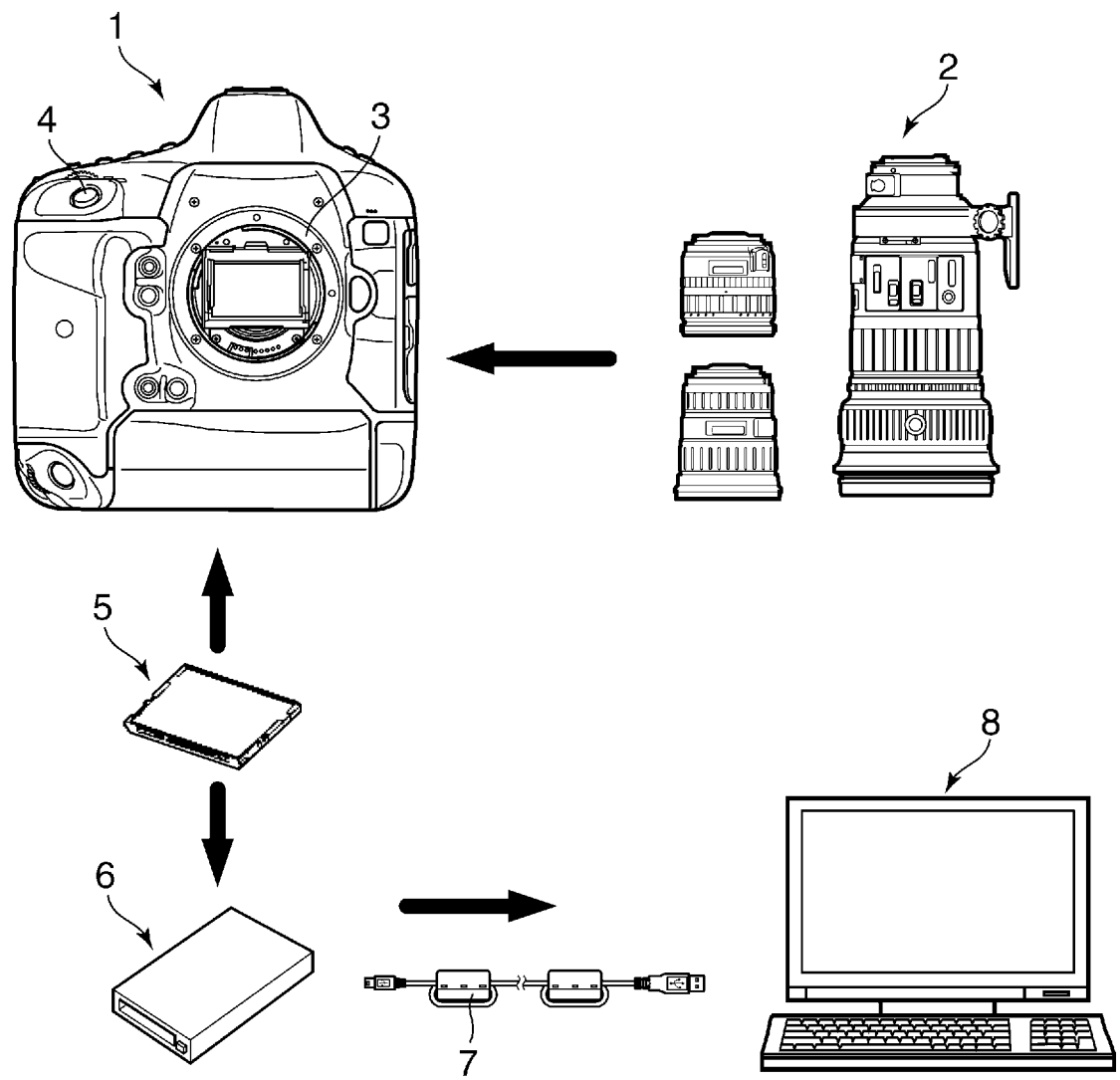
FIG. 1 is a diagram useful in explaining the configuration of an image pickup system including an image pickup apparatus that uses a card-type storage device according to a first embodiment.

FIG. 1 is a diagram useful in explaining the configuration of an image pickup system including the image pickup apparatus that uses the card-type storage device according to a first embodiment of the present invention. The image pickup system includes a camera body 1, a lens unit 2, the card-type storage device 5, a card reader 6, a connection cable 7, and a personal computer (PC) 8. The camera body 1 is a body of a so-called digital single-lens reflex camera. The camera body 1 includes an interface 3 (mount) which makes it possible to removably mount the lens unit 2 on the camera body 1, an operation section 4 (reference numeral 4 indicates one of components thereof in FIG. 1) for performing various operations on the camera body 1, and an image pickup device for converting an image of light having passed through the lens unit 2 to image data. The image pickup apparatus is formed by the camera body 1, the lens unit 2, and the card-type storage device 5.

The card-type storage device 5 has a flat, thin, and approximately rectangular card-like shape which can be inserted into and removed from the camera body 1 and the card reader 6. Image data obtained by image pickup with the predetermined lens unit 2 mounted on the camera body 1 and also with the card-type storage device 5 mounted therein is stored in the card-type storage device 5. The card reader 6 and the PC 8 are communicably connected by the connection cable 7. The image data stored in the card-type storage device 5 can be transmitted to the PC 8 via the connection cable 7 in a state in which the card-type storage device 5 is inserted into the card reader 6. Note that the PC 8 may be a server or the like on a network. Further, the card-type storage device 5 and the PC 8 may be communicably connected by wireless communication, without using the connection cable 7. Furthermore, the image pickup apparatus may be configured such that the camera body 1 and the PC 8 are communicably connected without using the card reader 6, thereby enabling communication between the card-type storage device 5 mounted in the camera body 1 and the PC 8.

Figure 2A:
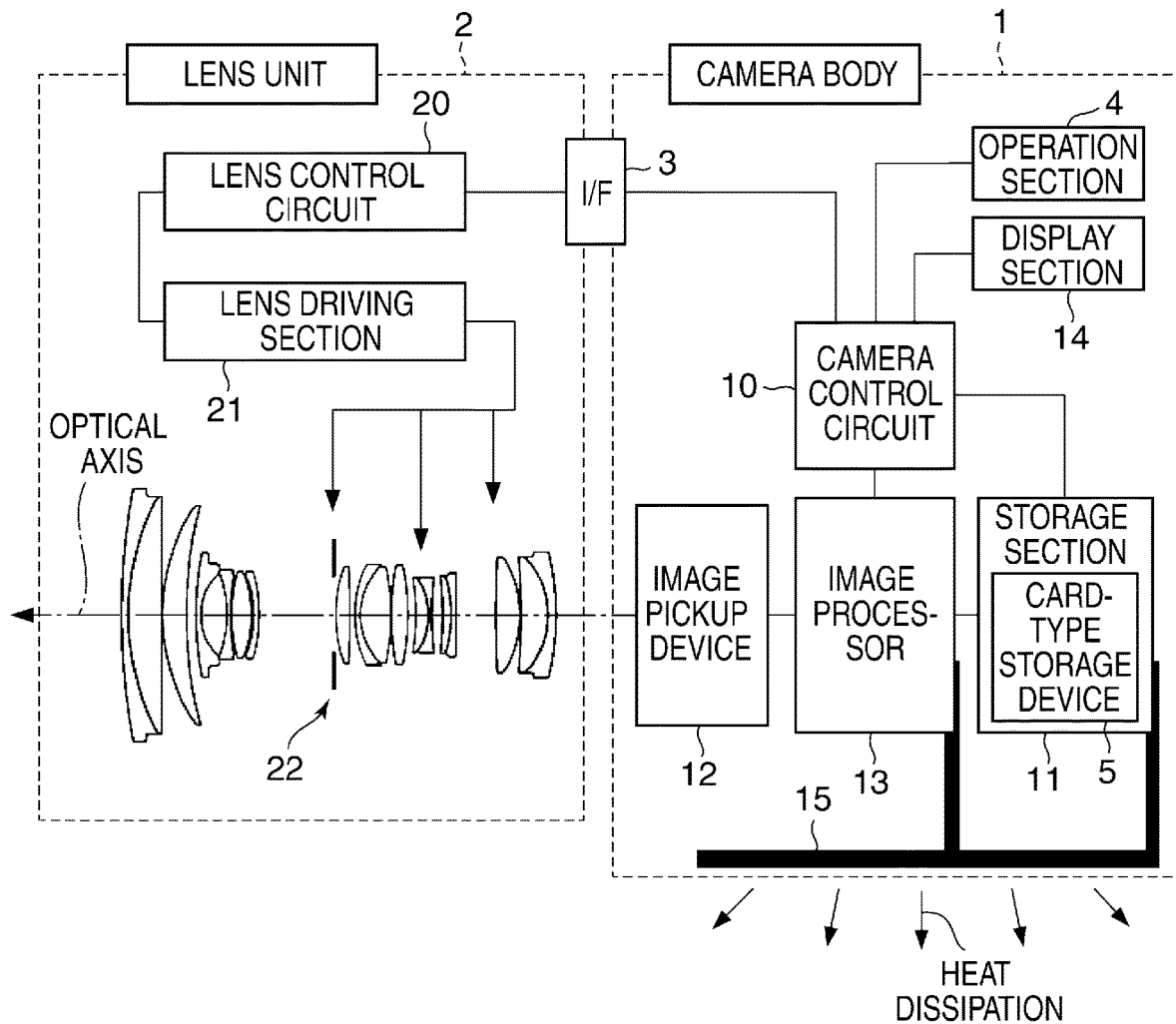
FIG. 2A is a schematic block diagram of a camera body and a lens unit of the image pickup apparatus.

FIG. 2A is a schematic block diagram of the camera body 1 and the lens unit 2 of the image pickup apparatus. In FIG. 2A, the same components as those appearing in FIG. 1 are denoted by the same reference numerals. The camera body 1 includes the operation section 4, a camera control circuit 10, a storage section 11, the image pickup device 12, an image processor 13, a display section 14, and a heat transfer section 15. The lens unit 2 includes a lens system control circuit 20, a lens driving section 21, and an image pickup optical system 22. Note that the camera body 1 and the lens unit 2 are made removable by the interface 3, as mentioned above.

The camera control circuit 10 is a dedicated processor, such as a microcomputer or an ASIC, and controls the overall operation of the image pickup apparatus. When a user operates the operation section 4 to instruct the camera control circuit 10 to perform various operations, the camera control circuit 10 performs operations and processes according to inputs from the operation section 4. The image pickup device 12 converts an image of light guided from the image pickup optical system 22 to electrical signals, and supplies the electrical signals to the image processor 13. The camera control circuit 10, the lens system control circuit 20, and the lens driving section 21 drives the image pickup optical system 22 to perform so-called AF (automatic focusing), AE (automatic exposure), and so forth. The display section 14 includes a finder for a photographer to confirm an object, and a liquid crystal panel capable of displaying the object, shot images, setting conditions of the camera body 1, etc. thereon.

The image processor 13 includes an analog-to-digital converter, a white balance adjustment circuit, a gamma correction circuit, an interpolation calculation circuit, and so forth, none of which are particularly shown, and generates image data based on the electrical signals supplied from the image pickup device 12. Further, the image processor 13 performs compression/expansion of image data and audio data. The storage section 11 includes the slot into which and from which the card-type storage device 5 can be inserted and removed, and interfaces, not particularly illustrated, which enable communication between the card-type storage device 5, and the camera control circuit 10 and the image processor 13. According to an instruction via the camera control circuit 10, image data generated by the image processor 13 is written into the card-type storage device 5, or inversely image data stored in the card-type storage device 5 is read out to the image processor 13.

The heat transfer section 15 is formed by a heat pipe, a graphite sheet or the like, and thermally connects the image processor 13 and the storage section 11 as heat sources in the image pickup apparatus to a heat dissipating section (e.g. an exterior member) of the camera body 1. This makes it possible to dissipate heat generated within the camera body 1 from the image pickup apparatus to an external atmosphere (ambient air) e.g. through natural convection and natural radiation. Note that the constructions of the components of the image pickup apparatus, other than the card-type storage device 5, are well-known, and hence further detailed description of the components other than the card-type storage device 5 is omitted.

Figure 2B:
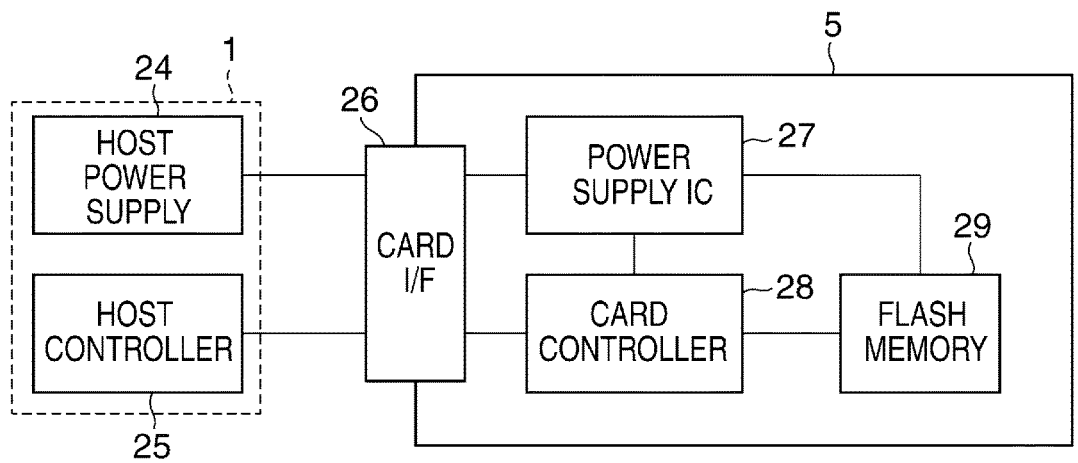
FIG. 2B is a schematic block diagram of the card-type storage device connected to the camera body.

FIG. 2B is a schematic block diagram of an electrical configuration of the card-type storage device 5 connected to the camera body 1. The card-type storage device 5 includes a power supply IC 27, a card controller 28, and a flash memory 29. The camera body 1 includes a host power supply 24 and a host controller 25. The card-type storage device 5 is electrically connected to the camera body 1 (storage section 11) via a card interface 26. Note that the specifications of the card interface 26 conform to standards specified for the card-type storage device 5.

The host power supply 24 and the power supply IC 27 are connected via power supply contacts of the card interface 26, and the host controller 25 and the card controller 28 are connected via signal transmission contacts of the card interface 26. The host power supply 24 is a stable power supply comprised e.g. of a battery and a power supply IC included in the camera body 1. The power supply IC 27 generates a level of voltage which is required for operations of the card controller 28 and the flash memory 29, using electric power supplied from the host power supply 24, and supplies the voltage to the card controller 28 and the flash memory 29. The host controller 25 is a control unit for performing data communication with the card controller 28 and communication control, and the function thereof can be entrusted to the camera control circuit 10 or the image processor 13. The flash memory 29 stores image data, such as image data received from the image processor 13. The card controller 28 has functions of error correction, block management, wear leveling. The card controller 28 stores the image data transmitted from the image processor 13 via the host controller 25 in the flash memory 29, and further sends data stored in the flash memory 29 to the image processor 13 via the host controller 25. Note that although in the illustrated example, one flash memory 29 is shown, the power supply IC 27 and the card controller 28 may be configured to be associated with a plurality of flash memories 29.

Figure 3A:
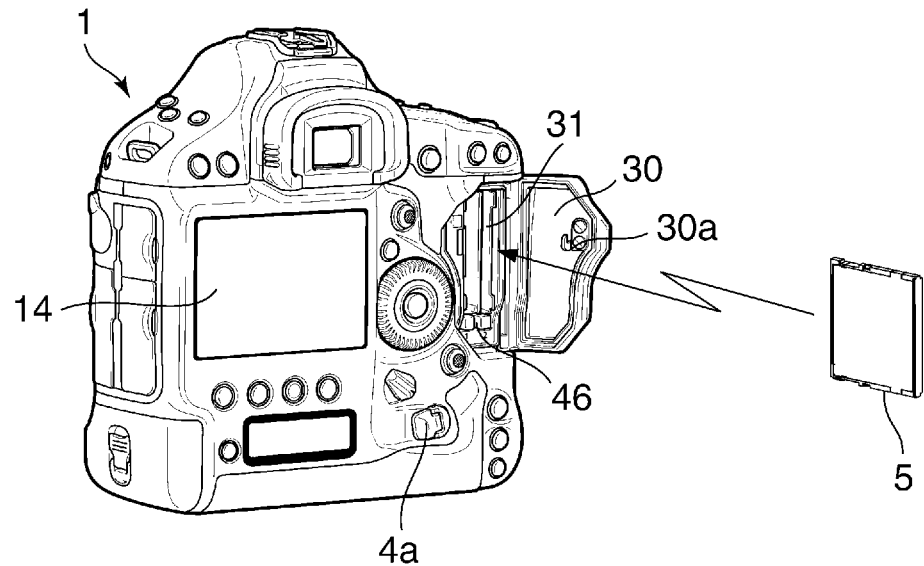
FIG. 3A is a perspective view of the image pickup apparatus, which is useful in explaining how the card-type storage device is inserted into and removed from the image pickup apparatus.

FIG. 3A is useful in schematically explaining how the card-type storage device 5 is inserted into and removed from the camera body 1. A slot lid 30 having a hook 30a, and a button 4a for operating the hook 30a are provided on a rear side of the camera body 1. Note that the button 4a is one of the components of the operation section 4. When the button 4a is pressed, the hook 30a provided on the slot lid 30 is disengaged to open the slot lid 30, whereby an opening of a slot 31 for insertion and removal of the card-type storage device 5 is exposed to the outside. This make it possible to insert and remove the card-type storage device 5 into and from the slot 31. The camera body 1 has provided thereon an eject button 46 at a location adjacent to the slot 31. When the card-type storage device 5 is inserted into (mounted in) the slot 31, the eject button 46 protrudes. When the eject button 46 is pushed toward the camera body 1, the card-type storage device 5 protrudes from the slot 31 to a position where the card-type storage device 5 can be pinched by fingers of the user. This makes it possible to remove the card-type storage device 5 from the slot 31.

The slot 31 has a structure which can mount two card-type storage devices 5 of the same type or of different types in parallel with each other. The slot lid 30 is provided with an open/close detection sensor (not shown). When the camera control circuit 10 detects that the slot lid 30 is closed, based on a signal from the open/close detection sensor, the camera control circuit 10 checks whether or not a card-type storage device 5 is mounted in the slot 31. In a case where the card-type storage device 5 is mounted in the slot 31, the camera control circuit 10 enables communication between the camera body 1 and the card-type storage device 5. On the other hand, when the button 4a is pressed, the camera control circuit 10 immediately terminates the communication between the camera body 1 and the card-type storage device 5.

Figure 3B:
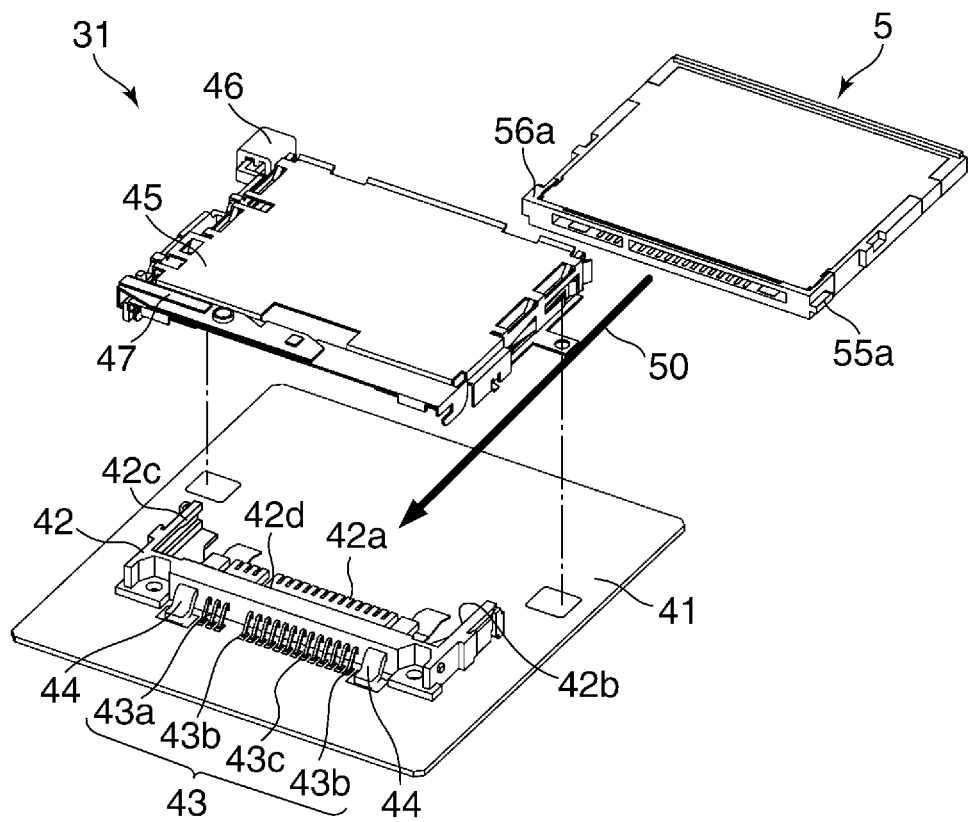
FIG. 3B is an exploded perspective view of a slot of the camera body and the card-type storage device, which is useful in explaining how the card-type storage device is inserted into and removed from the image pickup apparatus.

FIG. 3B is a schematic view of the slot 31, which is useful in explaining a method of inserting the card-type storage device 5 into the slot 31. The slot 31 is shown in an exploded perspective view. The slot 31 includes a slot-side substrate 41, a slot base 42, and a slot cover 45. The slot base 42 is fixed to the slot-side substrate 41. The slot base 42 includes a slot-side connector 42a electrically connected to card-side electrical contacts 58 (see FIG. 4A) of the card-type storage device 5, and slot-side guide sections 42b and 42c for guiding the card-type storage device 5 in an inserting/removing direction of the card-type storage device 5 when the card-type storage device 5 is inserted into or removed from the slot 31. Further, the slot base 42 includes a card abutment surface 42d with which a terminal surface 51 (see FIG. 4A) as a front end surface of the card-type storage device 5 is brought into abutment in the inserting/removing direction thereof. Although in FIG. 3B, the slot-side guide section 42b is opposed to the slot-side guide section 42c in a width direction of the slot 31 (a direction orthogonal to both the inserting/removing direction of the card-type storage device 5 and a direction of thickness of the slot-side substrate 41), the slot-side guide section 42b is out of sight due to the point of view.

A plurality of (two, in the present embodiment) slot-side thermal contacts 44 and a plurality of slot-side electrical contacts 43 are press-fitted into and held by the slot base 42. The slot-side electrical contacts 43 include slot-side power supply contacts 43a as electrical contacts for power supply signals, slot-side general-purpose communication contacts 43b as electrical contacts for communication signals not requiring high-speed communication, and slot-side high-speed communication contacts 43c as electrical contacts for high-speed communication. The slot-side power supply contacts 43a are used for electrical connection between the host power supply 24 and the power supply IC 27 appearing in FIG. 2B. The slot-side general-purpose communication contacts 43b and the slot-side high-speed communication contacts 43c are used for electrical connection (signal communication) between the host controller 25 and the card controller 28 appearing in FIG. 2B.

The slot-side thermal contacts 44 are disposed at two locations with a predetermined spacing therebetween, and the plurality of slot-side electrical contacts 43 are disposed between the slot-side thermal contacts 44. The slot-side power supply contacts 43a at which signal characteristics are not largely influenced by heat are arranged at locations closer to one of the slot-side thermal contacts 44, and the slot-side general-purpose communication contacts 43b are provided at locations closer to the slot-side power supply contacts 43a. Further, the slot-side high-speed communication contacts 43c at which the signal characteristics are largely influenced by heat are provided at or around the center of the slot base 42 remotest from the slot-side thermal contacts 44. Signals passing through the slot-side high-speed communication contacts 43c are generally high-speed signals, such as PCIe signals or SATA signals, which require impedance control, and twisted pair lines of equal impedance are used for wiring for the signals. Therefore, it is desirable to arrange the slot-side high-speed communication contacts 43c at locations where characteristics of signals are difficult to be influenced by heat.

As the slot base 42, there is suitably used a molded article (injection molded article, for example) of LCP (liquid crystal polymer) from the viewpoints of a heat resisting property high enough to resist reflow soldering, thinness for forming a compact and thin shape, flowability that enables formation of a complicated shape, slidability, and so forth. As each slot electrical contact 43, there is suitably used one formed by performing predetermined plating (such as gold plating) on phosphor bronze from the viewpoints of a spring property for bringing itself into contact with a mating one of the card-side electrical contacts, solder wettability, contact electric resistance, and so forth.

As each slot-side thermal contact 44, there is suitably used one formed by performing plating treatment (such as hard chromium plating) on copper alloy, from the viewpoints of thermal conductivity, a sliding property, abrasion resistance, etc. Although the plating coating (plating material) of the slot thermal contact 44 has thermal conductivity lower than that of pure copper or copper alloy, it is sufficiently small in thickness (normally, several micrometers), and hence there is no problem in its heat resistance. On the other hand, the use of the hard chromium plating makes it possible to largely improve the surface hardness of the slot-side thermal contacts 44, and hence it is possible to form a thermal contact which is difficult to be scratched by the insertion/removal of the card-type storage device 5, and is highly reliable.

For the slot cover 45, there is suitably used stainless spring steel from the viewpoints of strength, workability and corrosion resistance, when it is formed into a thin shape. The slot cover 45 is engaged with the slot base 42, and is fixed to the slot-side substrate 41 e.g. with screws. When the eject button 46 provided on the slot cover 45 is pushed, an ejection mechanism 47 provided on the slot cover 45 operates to cause the card-type storage device 5 mounted in the slot 31 to be pushed out to a predetermined position.

Card-side guide portions 55a and 56a are provided on respective side surfaces of the card-type storage device 5 in a width direction thereof (corresponding to the width direction of the slot 31 when the card-type storage device 5 is mounted in the slot 31). The card-type storage device 5 is inserted in a direction indicated by an arrow 50 while being roughly positioned by the slot cover 45 (while being guided with much play). Then, the card-side guide portions 55a and 56a are engaged with the slot-side guide sections 42b and 42c, respectively, whereby the card-type storage device 5 is guided in the direction indicated by the arrow 50 while being precisely positioned. The card-type storage device 5 is eventually inserted up to a position where it is brought into abutment with the card abutment surface 42d of the slot base 42, whereby the slot-side electrical contacts 43 and the card-side electrical contacts 58 are brought into contact with each other, which makes it possible to perform stable communication between the card-type storage device 5 and the camera body 1.

Figure 4A:
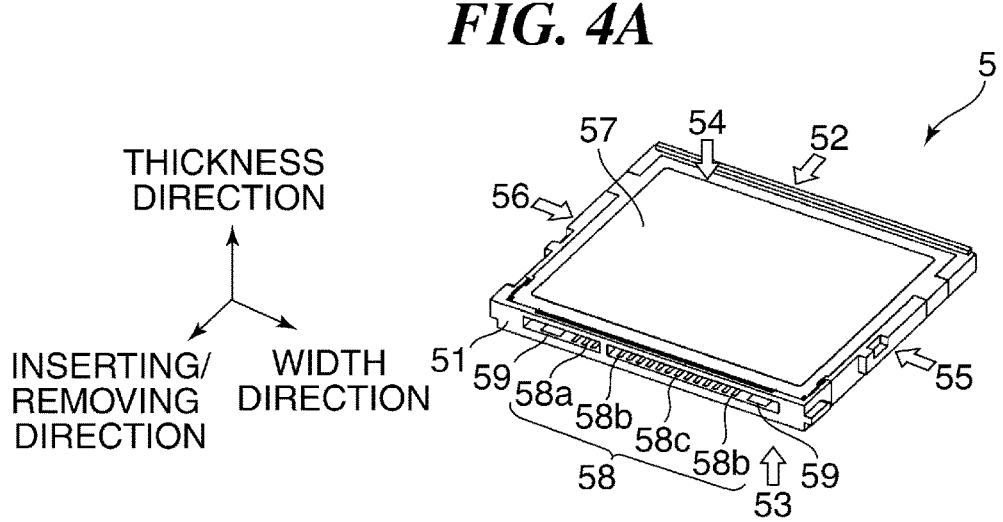
FIG. 4A is a schematic perspective view of the card-type storage device.

FIG. 4A is a schematic perspective view of the card-type storage device 5. The card-type storage device 5 has a flat, thin, and approximately rectangular card-like shape. Therefore, for convenience of explanation, a thickness direction, an inserting/removing direction, and a width direction are defined for the card-type storage device 5, as three directions orthogonal to each other, as shown in FIG. 4A. The thickness direction is a direction of the smallest dimension of the card-type storage device 5. The inserting/removing direction is a direction in which the card-type storage device 5 is inserted into and removed from the slot 31. The width direction is a direction orthogonal to both the thickness direction and the inserting/removing direction. In accordance with these definitions, two surfaces of the card-type storage device 5 in the thickness direction are referred to as a first surface 53 and a second surface 54, respectively, and two surfaces thereof in the inserting/removing direction are referred to as the terminal surface 51 and a rear end surface 52, respectively. Further, two surfaces thereof in the width direction are referred to as a first side surface 55 and a second side surface 56, respectively. Note that in FIG. 4A, the rear end surface 52, the first surface 53, and the second side surface 56 are out of sight due to the point of view.

The card-side electrical contacts 58 and card-side thermal contacts 59 are exposed from a recess formed in the terminal surface 51. The card-side electrical contacts 58 and card-side thermal contacts 59 correspond to the card interface 26 appearing in FIG. 2B. The card-side electrical contacts 58 include card-side power supply contacts 58a as electrical contacts for power supply signals, card-side general-purpose communication contacts 58b as electrical contacts for communication signals not requiring high-speed communication, and card-side high-speed communication contacts 58c as electrical contacts for high-speed communication. The arrangement of the card-side electrical contacts 58 and the card-side thermal contacts 59 corresponds to the arrangement of the terminals of the slot 31, described with reference to FIG. 3B. The card-side electrical contacts 58 and the card-side thermal contacts 59 are arranged from the side of the second side surface 56 toward the side of the first side surface 55 in the order of the card-side thermal contact 59, the card-side power supply contacts 58a, the card-side general-purpose communication contacts 58b, the card-side high-speed communication contacts 58c, the card-side general-purpose communication contacts 58b, and the card-side thermal contact 59. Note that when the position (height) of the card-side electrical contacts 58 and that of the card-side thermal contacts 59 in the thickness direction are different, there is a fear that the entire thickness of the card-type storage device 5 is increased. To solve this problem, in the present embodiment, the card-side electrical contacts 58 and the card-side thermal contacts 59 are arranged such that they are located at the same position in the thickness direction.

Figure 4B:
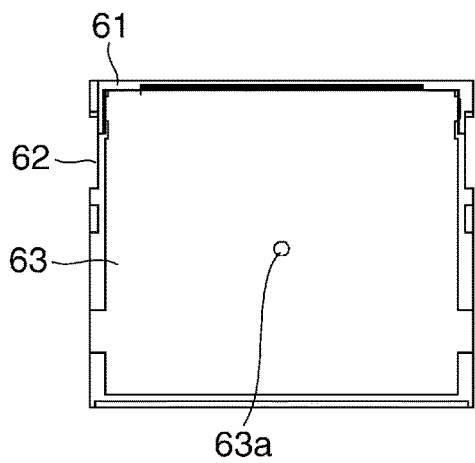
FIG. 4B is a plan view of the card-type storage device, as viewed in a thickness direction from the side of a second surface in a state having a second surface card label removed therefrom, toward the side of a first surface.

A second surface card label 57 is affixed to the second surface 54 of the card-type storage device 5. The second-surface card label 57 describes information indicative of standards with which the card medium 5 is compliant, the storage capacity and communication speed of the card medium 5, and so forth. FIG. 4B is a plan view of the card-type storage device 5 in a state in which the second surface card label 57 is removed therefrom, as viewed in the thickness direction from the side of the second surface 54 toward the side of the first surface 53. When the second surface card label 57 is removed, there appears a second surface card exterior 63 in its entirety to which the second surface card label 57 was affixed. The second surface card exterior 63 is formed with a hole 63a for injecting a potting material, and is surrounded by a card frame body 62, on the sides of the rear end surface 52, the first side surface 55, and the second side surface 56.

Figure 4D:
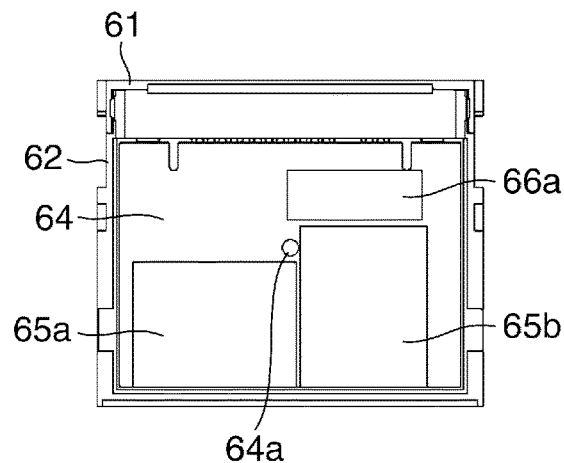
FIG. 4D is a plan view of the card-type storage device, as viewed in the thickness direction from the side of the second surface in a state having a second surface card exterior removed therefrom, toward the first surface side.
Figure 4C:
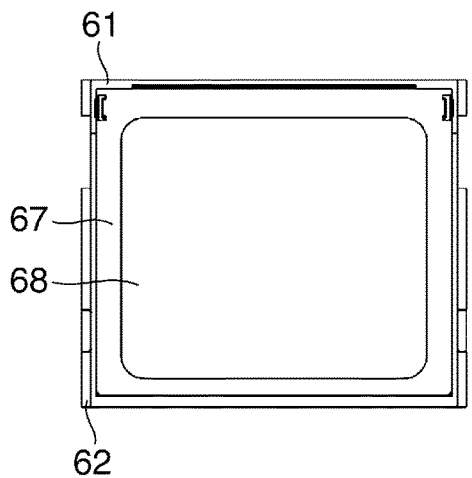
FIG. 4C is a plan view of the card-type storage device, as viewed in the thickness direction from the first surface side toward the second surface side.
Figure 4E:
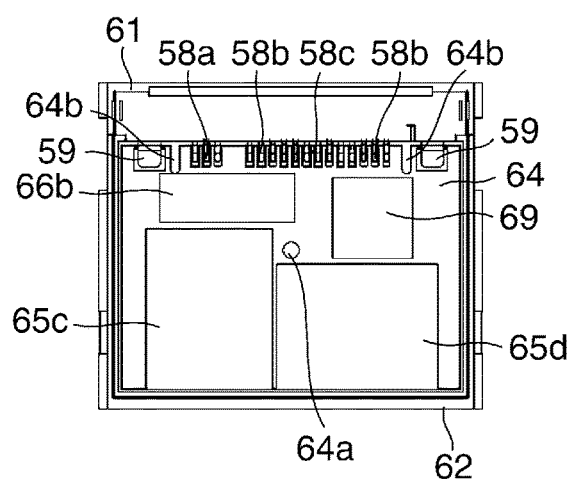
FIG. 4E is a plan view of the card-type storage device, as viewed in the thickness direction from the side of the first surface in a state having a first surface card exterior removed therefrom toward the second surface side

FIG. 4C is a plan view of the card-type storage device 5, as viewed in the thickness direction from the side of the side of the first surface 53 toward the side of the second surface 54. FIG. 4C shows a state in which a first surface card label 68 is affixed to a surface of a first surface card exterior 67. The first surface card exterior 67 is surrounded by the card frame body 62, on the sides of the rear end surface 52, the first side surface 55, and the second side surface 56. The second surface card exterior 63 and the first surface card exterior 67 are members which form an exterior (card housing) of the card-type storage device 5 together with a card-side connector 61 and the card frame body 62. Note that the first surface card label 68 is used by a user as a note space or the like FIG. 4D is a plan view of the card-type storage device 5 in a state in which the second surface card exterior 63 is removed therefrom, as viewed in the thickness direction from the side of the second surface 54 toward the side of the first surface 53 (a plan view in which the second surface card exterior 63 is removed from FIG. 4B). FIG. 4E is a plan view of the card-type storage device 5 in a state in which the first surface card exterior 67 is removed therefrom, as viewed in the thickness direction from the side of the first surface 53 toward the side of the second surface 54 (a plan view in which the first surface card exterior 67 is removed from FIG. 4C). The card-type storage device 5 includes a card-side substrate 64, the card-side connector 61, the card frame body 62, a flash memory ICs 65a, 65b, 65c, 65d, and a controller IC 69. The flash memory ICs 65a and 65b are mounted on the side of the second surface 54 of the card-side substrate 64, and the flash memory ICs 65c and 65d, and the controller IC 69 are mounted on the side of the first surface 53 of the card-side substrate 64. Note that the flash memory ICs 65a to 65d correspond to the flash memory 29 appearing in FIG. 2B, and the controller IC 69 corresponds to the card controller 28 appearing in FIG. 2B.

The controller IC 69 and the flash memory ICs 65a to 65d are electronic components (heat sources) which generate a large amount of heat by operations thereof. Especially, the amount of heat generated by the operation of the controller IC 69 is large. In the following description, when the controller IC 69, the flash memory ICs 65a to 65d, etc. are described as electronic components which generate heat by operations thereof, without particularly distinguishing between them, they are referred to as the "exothermic devices".

Power source ICs, not shown, capacitors, not shown, etc. are mounted on mounting areas 66a and 66b set on the card-side substrate 64. Note that in the state in which the card-type storage device 5 is mounted in the slot 31, the first surface card exterior 67 is opposed to the slot-side substrate 41, and the second surface card exterior 63 is opposed to the slot cover 45, in the thickness direction. A hole 64a is formed in the card-side substrate 64 such that the potting material injected into the card housing is capable of moving through the hole 64a from the side of the second surface 54 to the side of the first surface 53.

The card-side connector 61 has an elongated shape, and is arranged along the side of the terminal surface 51 of the card-side substrate 64 such that a longitudinal direction thereof is approximately parallel to a side of the card-side substrate 64 toward the terminal surface 51 (the width direction of the card-type storage device 5). As the card-side connector 61, similar to the slot base 42, there is suitably used a molded article of LCP, from the viewpoints of a heat resisting property high enough to resist reflow soldering, thinness for forming a compact and thin shape, flowability that enables formation of a complicated shape, slidability, and so forth. The card-side connector 61 is provided with a hole and a snap-fitting portion, and the card-side electrical contacts 58 and the card-side thermal contacts 59 are held by the card-side connector 61 by being press-fitted into the hole. The arrangement of the card-side electrical contacts 58 and the card-side thermal contacts 59 in the card-side connector 61 is as described with reference to FIG. 4A.

The card-side electrical contacts 58 have no spring property, and for the card-side electrical contacts 58, there is suitably used copper alloy subjected to plating treatment (gold plating, for example), from the viewpoints of the wettability of solder, contact electric resistance, etc. For the card-side thermal contacts 59, for the same reason as in the case of the slot-side thermal contacts 44, there is suitably used pure copper or copper alloy subjected to plating treatment (hard chromium plating, for example), from the viewpoints of thermal conductivity, a sliding property, abrasion resistance, etc. The card-side thermal contacts 59 and the slot-side thermal contacts 44 provided in the slot 31 are configured, such that they are brought into surface contact with each other on a plane approximately orthogonal to the thickness direction when the card-type storage device 5 is mounted in the slot 31. This makes it possible to ensure high thermal conductivity. By forming the two card-side thermal contacts 59 at one end and the other end of the card-side connector 61, respectively, in a manner remotely spaced from each other in the longitudinal direction thereof, it is possible to suppress the tilting of the whole card-type storage device 5 and stabilize the contact of the card-side thermal contacts 59 with the slot-side thermal contacts 44.

Lands (terminals) are formed at respective portions of the card-side substrate 64, to which the card-side electrical contacts 58 and the card-side thermal contacts 59 provided on the card-side connector 61 are electrically and thermally connected (fixed) by soldering. These lands are formed along the side of the card-side substrate 64 toward the terminal surface 51 according to the arrangement of the card-side electrical contacts 58 and the card-side thermal contacts 59 on the card-side connector 61. Cutouts 64b are formed in the card-side substrate 64 between lands to which the card-side thermal contacts 59 are connected, and lands to which the card-side power supply contacts 58a are connected. Therefore, the card-side high-speed communication contacts 58c are arranged at respective locations remote from the card-side thermal contacts 59 in the width direction of the card-type storage device 5, with the cutouts 64b provided between the same and the card-side thermal contacts 59.

The card-side thermal contacts 59 are connected to grounds (GND) of the card-side substrate 64. A wiring width of each of grounds for connecting the exothermic devices and the card-side thermal contacts 59 is wider than a wiring width of each of grounds for connecting the exothermic devices and the card-side electrical contacts 58. For example, a solid ground is used for each of the grounds for connecting the exothermic devices and the card-side thermal contacts 59. On the other hand, the wiring width of each of the grounds for connecting the exothermic devices and the card-side electrical contacts 58 can be set to a minimum required width. Further, the grounds for electrically connecting the exothermic devices and the card-side electrical contacts 58 may be limited to only a minimum required number of grounds required for impedance control, that is, only grounds for the card-side high-speed communication contacts 58c. This makes it possible to efficiently transfer heat from the exothermic devices to the card-side thermal contacts 59 via the grounds, and thereby suppress heat transfer to the card-side electrical contacts 58. As a consequence, it is possible to suppress a rise in the temperature of the card-side high-speed communication contact 58c.

Although in the present embodiment, the cutouts 64b are formed between the lands to which the card-side thermal contacts 59 are connected and the lands to which the card-side power supply contacts 58a are connected, the positions for forming the cutouts 64b are not limited to those mentioned above. For example, one cutout 64b may be formed between the lands to which the card-side power supply contacts 58a are connected and the lands to which the card-side general-purpose communication contacts 58b are connected. In this case as well, it is possible to prevent the temperature of the card-side high-speed communication contacts 58c from being raised by transfer of heat from the card-side thermal contacts 59 and the card-side power supply contacts 58a.

Here, a method of assembling the card-type storage device 5 will be briefly described. The card-side substrate 64 is provided with lands (not shown) for mounting the card-side connector 61, and the card-side connector 61 is positioned and fixed to the card-side substrate 64 by soldering. After the card-side connector 61 is fixed to the card-side substrate 64, the card frame body 62 is assembled to the card-side connector 61. Then, by assembling the first surface card exterior 67 and the second surface card exterior 63 to the card frame body 62 and the card-side connector 61 from the thickness direction by snap-fitting (so-called click clamping), the card housing is completed as an exterior (outer shape) of the card-type storage device 5. After that, a potting material is injected into the card housing from the hole 63a formed in the second surface card exterior 63. Then, after the first surface card label 68 and the second surface card label 57 are affixed to respective predetermined positions, the card housing is heated to a predetermined temperature. This cures the potting material injected into the card housing to complete the card-type storage device 5. Note that by curing the potting material, it is possible to promote heat transfer from the exothermic devices mounted on the card-side substrate 64 to the card-side thermal contacts 59, and improve the sturdiness and weatherability of the card-type storage device 5. Note that in FIGS. 4D and 4E, illustration of the potting material is omitted.

Figure 5A:
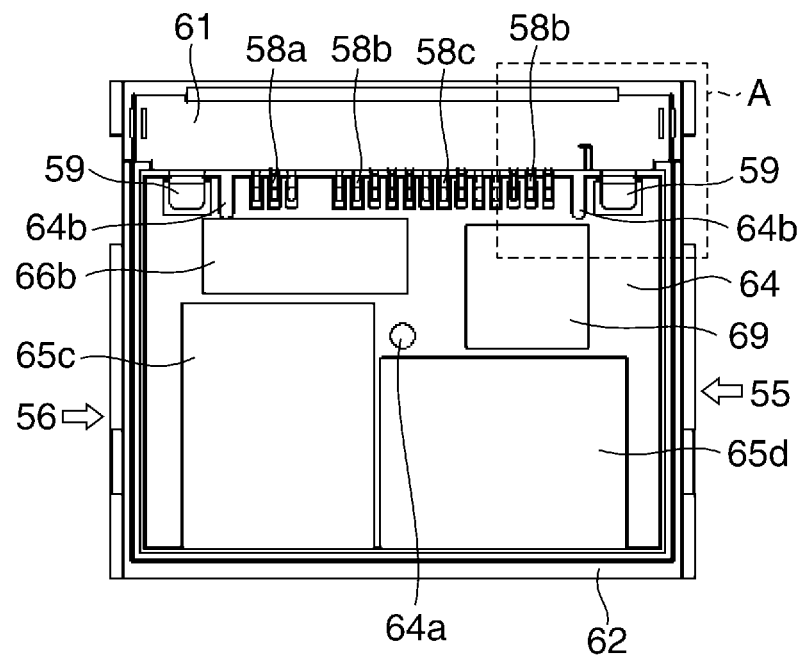
FIG. 5A is a plan view of the card-type storage device, similar to FIG. 4E.
Figure 5B:
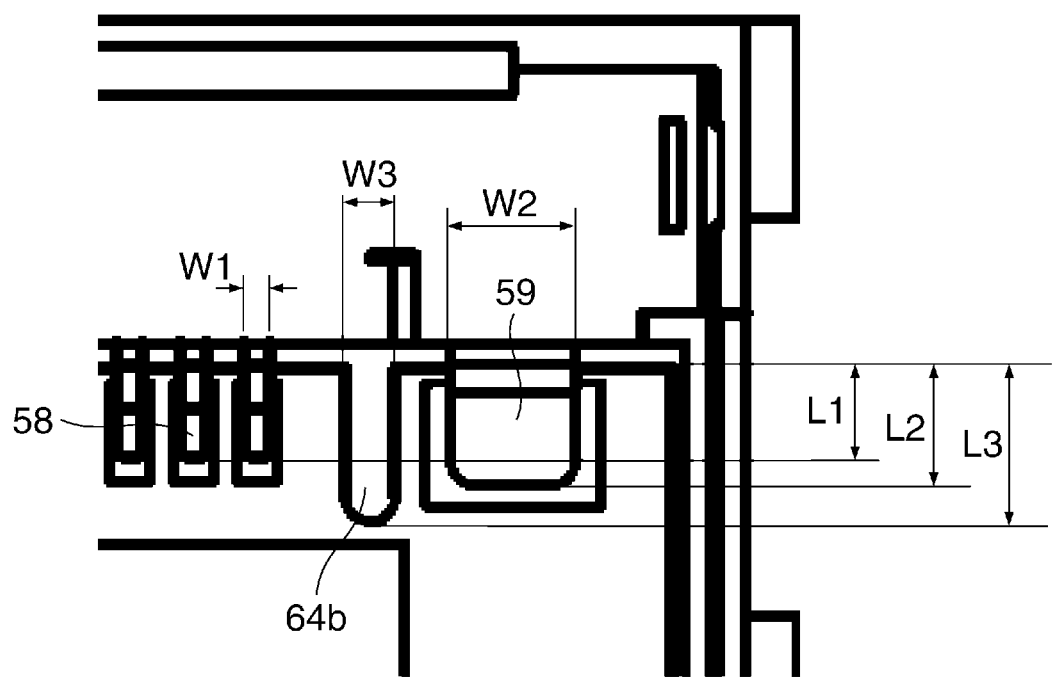
FIG. 5B is an enlarged view of a broken line area appearing in FIG. 5A.

FIG. 5A is a plan view of the card-type storage device 5 in the state having the first surface card exterior 67 removed therefrom, as viewed in the thickness direction from the side of the first surface 53 toward the side of the second surface 54, which is similar to FIG. 4E. FIG. 5B is an enlarged view of a broken line area A appearing in FIG. 5A. The card-side electrical contacts 58 each include a lead terminal electrically connected to the associated land provided on the card-side substrate 64, and a distance (length) from an end face of the card-side substrate 64 to an extremity of the lead terminal is represented by "L1". A distance (length) from the end face of the card-side substrate 64 to an extremity of a lead terminal included in each card-side thermal contact 59 is represented by "L2". Further, a distance (depth of each cutout 64b) from the end face of the card-side substrate 64 to a base of the cutout 64b formed in the card-side substrate 64 is represented by "L3". In this case, it is desirable that a relationship of "L1<L2<L3" holds.

This is for the following reason: In general, it is known that the temperature of a card-side substrate becomes higher as the location is closer to the center of the card-side substrate, and becomes lower as the location is closer to each end of the card-side substrate. Therefore, in the card-side substrate 64, by minimizing the length L1 of the lead terminal of each card-side electrical contact 58, and arranging the lead terminals at the end of the card-side substrate 64, it is possible to suppress a rise in the temperature of the card-side electrical contacts 58. Inversely, by making the card-side thermal contacts 59 closer to the center of the card-side substrate 64, it is possible to transfer the heat of high-temperature portions of the card-side substrate 64 to the card-side thermal contacts 59. Since the card-side thermal contacts 59 are fixed (joined) to the lands formed on the card-side substrate 64 by soldering, the thermal resistance of the card-side thermal contacts 59 is small. However, in general, thermal resistance between different substances tends to become larger than thermal resistance within a homogeneous substance, and hence there is a possibility that a temperature difference occurs between the card-side substrate 64 and the card-side thermal contacts 59 in a soldered portion of the card-side thermal contacts 59. In this case, there is a fear that the heat of joined portions of the card-side thermal contacts 59 and the card-side substrate 64 transfer to the card-side electrical contacts 58. To solve this problem, by making the cutout length L3 of the cutouts 64b larger than the distance L2 of the lead terminal included in the card-side thermal contact 59 from the end face of the card-side substrate 64, it is possible to suppress heat transfer to the card-side electrical contacts 58. Note that although it is desirable that the relationship of "L1<L2<L3" holds, as described above, it is possible to obtain a certain effect even when a relationship of "L1=L2<L3" or a relationship of "L2<L1<L3" holds.

As shown in FIG. 5B, a width of a lead terminal included in each card-side electrical contact 58 is represented by "W1", a width of the lead terminal included in each card-side thermal contact 59 is represented by "W2", and a width of each cutout 64b formed in the card-side substrate 64 is represented by "W3". In this case, it is the most desirable that a relationship of "W1<W3<W2" holds. This is for the following reason: By making the width W1 narrower, it is possible to suppress the heat transfer to the card-side electrical contacts 58. Further, by making the width W2 as wide as possible within a range in which the card-side connector 61 and the card-side electrical contacts 58 are not adversely affected, it is possible to transfer a larger amount of heat to the card-side thermal contacts 59. When the width W3 is too narrow, the effect of thermally insulating between the card-side electrical contacts 58 and the card-side thermal contacts 59 becomes smaller, so that it is desirable to set the width W3 to a width that makes it difficult to transfer heat. Note that that although it is desirable that the relationship of "W1<W3<W2" holds, as described above, it is possible to obtain a certain effect even when a relationship of "W2=W1" or a relationship of "W2<W3" holds.

Figure 6A:
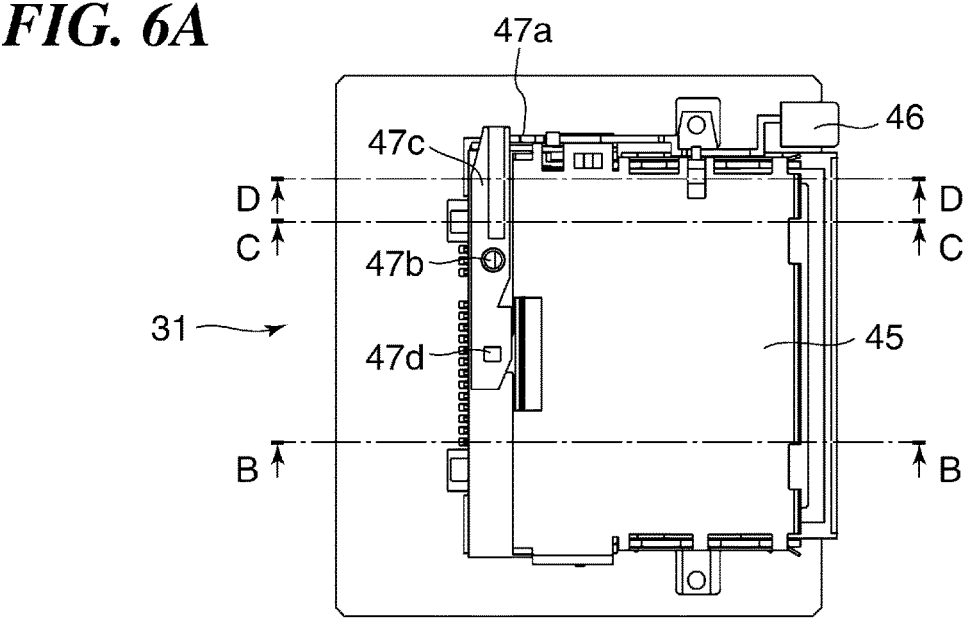
FIG. 6A is a plan view of the card-type storage device, as viewed in the thickness direction from the side of a slot cover in a state having the card-type storage device mounted therein.
Figure 6B:
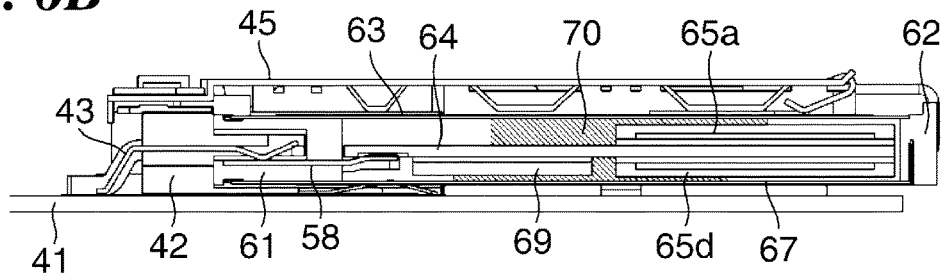
FIG. 6B is a cross-sectional view taken along B-B in FIG. 6A.
Figure 6C:
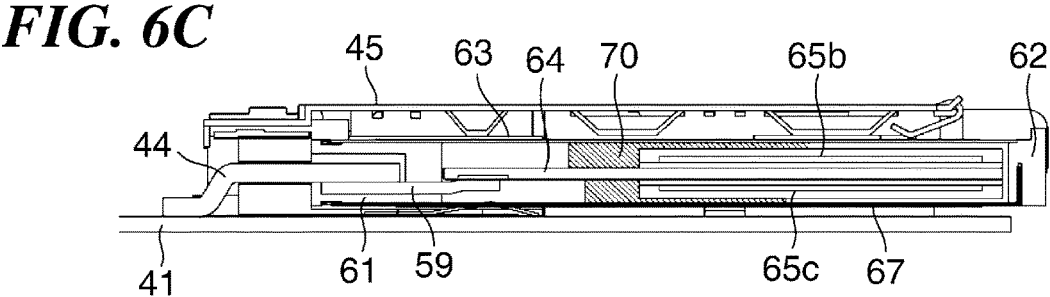
FIG. 6C is a cross-sectional view taken along C-C in FIG. 6A.
Figure 6D:
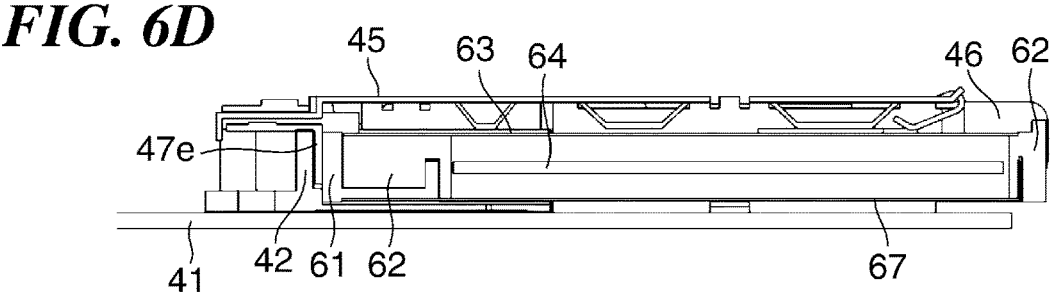
FIG. 6D is a cross-sectional view taken along D-D in FIG. 6A.

FIG. 6A is a plan view of the card-type storage device 5 in the state mounted in the slot 31, as viewed in the thickness direction from the side of the slot cover 45. FIG. 6B is a cross-sectional view taken along B-B in FIG. 6A. FIG. 6C is a cross-sectional view taken along C-C in FIG. 6A. FIG. 6D is a cross-sectional view taken along D-D in FIG. 6A. Note that in FIGS. 6A to 6D, to avoid illustrated contents from being complicated, hatchings indicating cross-sections of various members other than a potting material 70 are omitted.

The cross-sectional view taken along B-B in FIG. 6B is a cross-sectional view at a position including the slot-side electrical contact 43 and the controller IC 69 as a main exothermic device. The controller IC 69 is mounted in the card-side substrate 64 toward the slot-side substrate 41, and is thermally connected to the first surface card exterior 67 via the potting material 70. Further, in the cross-section taken along B-B, there appear the flash memory IC 65a as an exothermic device mounted on the card-side substrate 64 toward the second surface 54, and the flash memory IC 65d as an exothermic device mounted on the card-side substrate 64 toward the first surface 53. The flash memory ICs 65a and 65d are thermally connected to the second surface card exterior 63 and the first surface card exterior 67, respectively, via the potting material 70, similarly to the controller IC 69. Thus, by interposing the potting material 70 between the exothermic devices and the exterior materials, it is possible to enhance heat dissipation from the second surface card exterior 63 and the first surface card exterior 67 to the outside, compared with a case where this portion remains as an air layer.

The slot-side electrical contacts 43 each have a spring property, as mentioned above, and are in contact with the card-side electrical contacts 58 while urging the same from the upper side to the lower side in FIG. 6B. The position of the card-side electrical contacts 58 in the thickness direction is determined by contact between the slot-side thermal contacts 44 and the card-side thermal contacts 59. Therefore, by properly setting the position of the card-side electrical contacts 58 in the thickness direction, it is possible to bring the slot-side electrical contacts 43 and the card-side electrical contacts 58 into proper contact with each other. More specifically, the card-side electrical contacts 58 may be inserted into a position which is higher than a lower end position of the slot-side electrical contacts 43 toward the slot-side substrate 41 in a state in which the card-type storage device 5 is not inserted into the slot 31, and also lower than a position which corresponds to a limit of elasticity of the slot electrical contacts 43.

When focusing on the inserting/removing direction, the card abutment surface 45 of the slot base 42 and the terminal surface 51 of the card medium 5 are in contact with each other. In this position, the card electrical contacts 58 and the slot electrical contacts 43 are each in an opposed relation with respect to the inserting/removing direction. That is, the card electrical contacts 58 extend in the inserting/removing direction, to be brought into contact with predetermined associated ones of the card electrical contacts 58, respectively.

The cross-sectional view taken along C-C in FIG. 6C is a cross-sectional view at a position including the slot-side thermal contact 44 and the card-side thermal contact 59. In the cross-section taken along C-C, there appear the flash memory IC 65b as an exothermic device mounted on the card-side substrate 64 toward the second surface 54, and the flash memory IC 65c as an exothermic device mounted on the card-side substrate 64 toward the first surface 53. The flash memory ICs 65b and 65c are thermally connected to the second surface card exterior 63 and the first surface card exterior 67 via the potting material 70, respectively, similarly to the flash memory ICs 65a and 65d appearing in FIG. 6B. Therefore, it is possible to enhance dissipation of heat from the second surface card exterior 63 and the first surface card exterior 67 to the outside.

Since the slot-side thermal contacts 44 have no spring property, and the card-side thermal contacts 59 as well have no spring property, the slot-side thermal contacts 44 and the card-side thermal contacts 59 are configured to be brought into surface contact with each other by positioning and fitting of them. When the card-type storage device 5 is inserted into the slot 31, heat generated by the exothermic devices, such as the controller IC 69, within the card housing of the card-type storage device 5, is transferred to the slot-side substrate 41 via the card-side substrate 64, the card-side thermal contacts 59, and the slot-side thermal contacts 44. The heat transferred to the slot-side substrate 41 is exhausted from the camera body 1 to the outside via the heat transfer section 15 (see FIGS. 2A and 2B). Although such a heat transfer path looks long, the thermal resistance of each portion thereof is small.

That is, in each of a pair of an exothermic device, such as the controller IC 69, and the card-side substrate 64, a pair of the card-side substrate 64 and the card-side thermal contact 59, and a pair of the slot-side thermal contact 44 and the slot-side substrate 41, connected portions are soldered, and hence the thermal resistance thereof is small. Further, the card-side substrate 64 and the slot-side substrate 41 are multilayer substrates, and are subjected to patterning such that a large amount of copper remains, e.g. by arranging wide power-related portions and ground (so-called solid ground) in intermediate layers thereof, and hence the thermal resistance of the substrates is not large. Furthermore, since copper alloy is used for the slot-side thermal contacts 44 and the card-side thermal contacts 59, the thermal resistance due to contact is small. Further, thermal resistance due to contact between each slot-side thermal contact 44 and each card-side thermal contacts 59 is reduced by bringing them into surface contact with each other, so that the thermal resistance is also small here. Therefore, since the thermal resistance of each portion of the heat transfer path from the exothermic devices to the slot-side substrate 41 can be made sufficiently small, it is possible to efficiently exhaust heat to the outside of the camera body 1 by using the heat transfer path. Note that the heat transfer path from the exothermic devices to the slot-side substrate 41 can be discussed in relation to thermal conductivity, but while the thermal conductivity is a physical property value, the thermal resistance represents the ease of transfer of heat through substances including shapes (structures) thereof, so that this description is given using the thermal resistance.

Note that although the thermal conductivity of the card-side connector 61 is low since a molded article of LCP is used as the card-side connector 61, it is considered that heat is transferred from the card-side thermal contacts 59 to the card-side electrical contacts 58 via the card-side connector 61. To solve this problem, the configuration may be such that when the card-side thermal contacts 59 are fixed to the card-side substrate 64, a clearance is provided along an entire periphery of the card-side connector 61 such that the card-side thermal contacts 59 are not brought into direct contact with the card-side connector 61. Further, instead of providing the clearance, a material having a lower thermal conductivity (a thermal insulating property) than LCP may be interposed between the card-side thermal contacts 59 and the card-side connector 61.

FIG. 6D is a cross-sectional view at a position including the ejection mechanism 47. The eject mechanism 47 is provided on the slot cover 45, and includes the eject button 46, an eject arm 47a interlocked with the eject button 46, an rotary arm 47c which is rotated about a rotation center 47b, and an eject plate, portions of which are shown. The illustrated portions of the eject plate are a lug 47d appearing in FIG. 5A, and legs 47e formed at respective opposite ends in a direction orthogonal to the inserting/removing direction (one of the legs 47e appears in FIG. 6D). The rotary arm 47c is arranged to be rotatable about the rotation center 47b fitted on a protrusion, not shown, formed on the slot cover 45. The rotary arm 47c is rotatably engaged with the lug 47d. The eject arm 47a connected to the rotary arm 47c is guided by a guiding protrusion provided on the slot cover 45, and is held in a manner slidable only in the inserting/removing direction of the card medium 5 (only in a let-right direction as viewed in FIG. 6A). Further, the eject button 46 is disposed at one end of the eject arm 47a via a link portion 46a, and the other end of the eject arm 47a is engaged with the rotary arm 47c. Therefore, the movement of the eject arm 47a and that of the rotary arm 47c are interlocked with each other. Further, the eject plate including the lug 47d and the legs 47e is held by guide portions (not shown) provided on the slot cover 45 in a manner slidable only in the left-right direction in FIG. 5A, similarly to the eject arm 47a. Further, since the rotary arm 47c and the eject plate are rotatably engaged with each other via the lug 47d, whereby when the eject arm 47a moves to the left, as viewed in FIG. 6A, the rotary arm 47c rotates anticlockwise about the rotation center 47b, whereby the lug 47d and hence the eject plate moves to the right, as viewed in the same.

When the card-type storage device 5 is inserted into the slot 31 in the direction indicated by the arrow 50 as described with reference to FIG. 3A, the eject button 46 protrudes. At this time, as shown in FIG. 6D, the card-type storage device 5 pushes in the legs 47e formed on the eject plate. As a consequence, the lug 47d of the eject plate moves to the left, the rotary arm 47c rotates clockwise, and the eject arm 47a moves to the right, whereby the eject button 46 protrudes to the right, as viewed in FIG. 6A. When the eject button 46 is pushed in so as to remove the card-type storage device 5 from the slot 31, the eject arm 47a moves to the left, the rotary arm 47c rotates counterclockwise, and the lug 47d of the eject plate moves to the right, as viewed in FIG. 6A. This causes the legs 47e formed on the eject plate to push out the card-type storage device 5 from the slot 31. Note that the legs 47e are only required to be capable of removing the card-type storage device 5 in the inserting/removing direction, and hence the legs 47e may be formed at any suitable locations. Further, the number of locations where the legs 47e are disposed is not limited to two as in the present embodiment, but may be one.

As described hereinabove, according to the present embodiment, it is possible to ensure sufficient thermal connection and electrical connection in the state in which the card-type storage device 5 is mounted in the slot 31. This makes it possible to suppress a rise in the temperature of signal lines for high-speed communication that requires impedance control and the like of the card-type storage device 5, and hence, it is possible to accurately perform transmission and reception of signals by high-speed communication.

Figure 7:
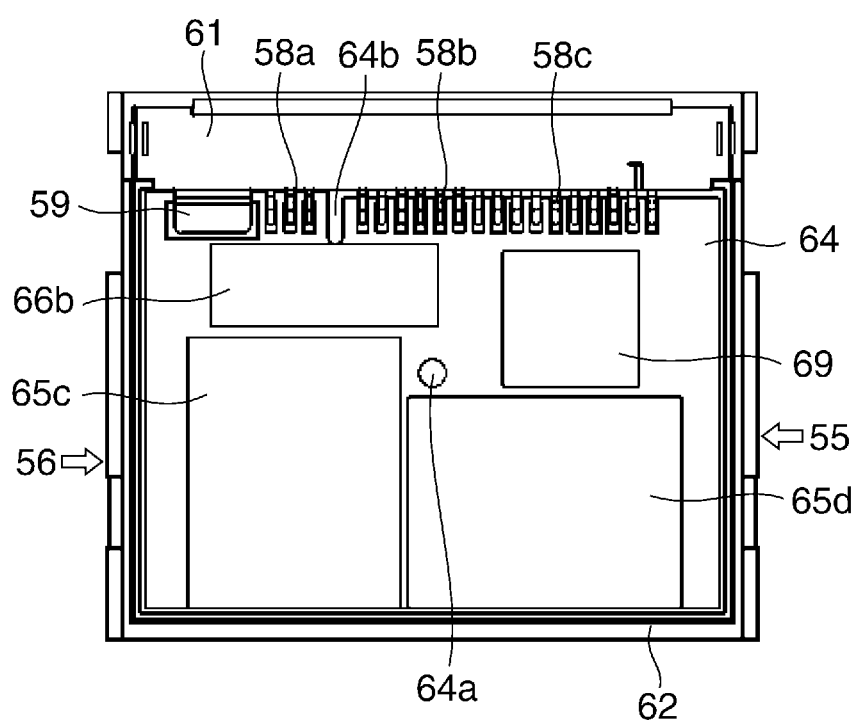
FIG. 7 is a schematic plan view of a card-type storage device according to a second embodiment.

Next, a description will be given of a card-type storage device according to a second embodiment of the present invention. FIG. 7 is a plan view of an internal construction of the card-type storage device 5A according to the second embodiment, which corresponds to FIG. 4E. The card-type storage device 5A is distinguished from the card-type storage device 5 described in the first embodiment, by the number of the card-side thermal contacts 59 and the position of the cutout 64b, and there is no substantial difference in construction other than these. Therefore, components of the card-type storage device 5A, which have the same functions as those of the above-described card-type storage device 5, are denoted by the same reference numerals, and description thereof is omitted.

In the card-type storage device 5A, the card-side thermal contact 59 is fixed to the card-side substrate 64 by soldering. In the card-side connector 61, there are arranged the card-side thermal contact 59, the card-side power supply contacts 58a, the cutout 64b, the card-side general-purpose communication contacts 58b, and the card-side high-speed communication contact 58c, in the mentioned order from the side of the second side surface 56 toward the side of the first side surface 55.

Wiring for connecting the card-side thermal contact 59 and the card-side electrical contacts 58 to the electronic components, such as the exothermic devices, which are mounted on the card-side substrate 64, can be the same as in the card-type storage device 5 according to the first embodiment, and hence description thereof is omitted. Further, in the slot 31, the positions of the various contacts arranged on the slot base 42 are changed to positions set according to the arrangement of the card-side thermal contact 59 and the card-side electrical contacts 58 of the card-type storage device 5A, such that the card-type storage device 5A can be inserted into and removed from the slot 31. Since the other construction than the above of the slot associated with the card-type storage device 5A is similar to the slot 31, description thereof is omitted.

In the card-type storage device 5A, the distance between the card-side high-speed communication contacts 58c and the card-side thermal contact 59 can be made larger than in the card-type storage device 5 according to the first embodiment. Further, the cutout 64b thermally insulates between the card-side power supply contacts 58a and the card-side general-purpose communication contacts 58b. This makes it possible to suppress a rise in the temperature of the card-side high-speed communication contacts 58c. Note that the location of the cutout 64b is not limited to between the card-side power supply contacts 58a and the card-side general-purpose communication contacts 58b, but the cutout 64b may be formed between the card-side thermal contact 59 and the card-side power supply contacts 58a.

In the card-type storage device 5A according to the second embodiment as well, similar to the card-type storage device 5 according to the first embodiment, it is possible to ensure sufficient thermal connection and electrical connection in the state in which the card-type storage device 5A is mounted in the slot. This makes it possible to suppress a rise in the temperature of signal lines for high-speed communication that requires impedance control and the like of the card-type storage device 5A, thereby making it possible to accurately perform transmission and reception of signals by high-speed communication.

Figure 8:
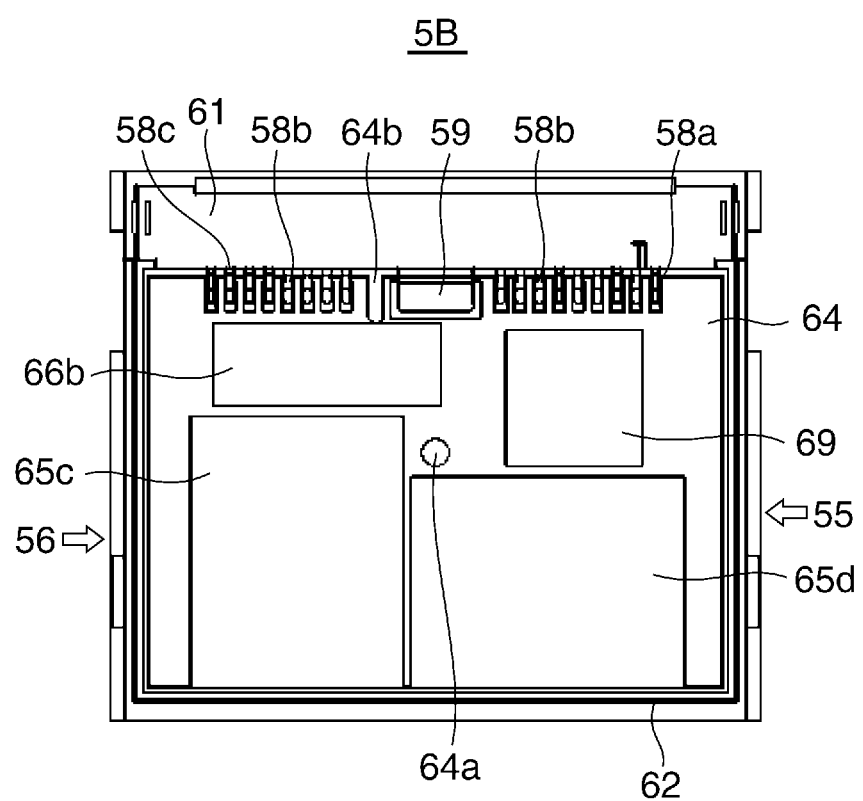
FIG. 8 is a schematic plan view of a card-type storage device according to a third embodiment.

Next, a description will be given of a card-type storage device according to a third embodiment of the present invention. FIG. 8 is a plan view of an internal construction of the card-type storage device 5B according to the third embodiment, which corresponds to FIG. 4E. The card-type storage device 5B is distinguished from the card-type storage device 5 described in the first embodiment, by the number of the card-side thermal contacts 59 and the location of the cutout 64b, and there is no substantial difference in construction other than the above. Therefore, components of the card-type storage device 5B, which have the same functions as those of the above-described card-type storage device 5, are denoted by the same reference numerals, and description thereof is omitted.

In the card-type storage device 5B, the card-side thermal contact 59 is fixed, by soldering, to the card-side substrate 64 in the central portion of the card-type storage device 5B in the width direction thereof. In the card-side connector 61, there are arranged the cutout 64b, the card-side general-purpose communication contacts 58b, and the card-side high-speed communication contacts 58c, in the mentioned order from the card-side thermal contact 59 toward the second side surface 56. Further, in the card-side connector 61, there are also arranged the card-side general-purpose communication contacts 58b and the card-side power supply contacts 58a, in the mentioned order from the card-side thermal contact 59 toward the first side surface 55.

Wiring for connecting the card-side thermal contact 59 and the card-side electrical contacts 58 to the electronic components, such as the exothermic devices, which are mounted on the card-side substrate 64, can be the same as in the card-type storage device 5 according to the first embodiment, and hence description thereof is omitted. Further, in the slot 31, the positions of the various contacts arranged on the slot base 42 are changed to positions set according to the arrangement of the card-side thermal contact 59 and the card-side electrical contacts 58 of the card-type storage device 5B, such that the card-type storage device 5B can be inserted into and removed from the slot 31. Since the other construction than the above of the slot associated with the card-type storage device 5B is similar to the slot 31, description thereof is omitted.

In the card-type storage device 5B, the card-side thermal contact 59 is provided at a location closer to the center of the card-side substrate 64 than in the card-type storage device 5 according to the first embodiment. Therefore, it is possible to perform efficient heat transfer from the central portion of the card-side substrate 64 to the slot, and suppress a rise in the temperature of the central portion of the card-side substrate 64. Further, in the card-type storage device 5B as well, similar to the card-type storage device 5, the distance between the card-side high-speed communication contacts 58c and the card-side thermal contact 59 can be made larger than in the card-type storage device 5 according to the first embodiment, whereby the cutout 64b thermally insulates between the card-side thermal contact 59 and the card-side general-purpose communication contacts 58b. This makes it possible to suppress a rise in the temperature of the card-side high-speed communication contacts 58c. Furthermore, by spacing the card-side power supply contacts 58a from the card-side thermal contact 59, it is possible to make uniform the temperature of the card-side substrate 64. Note that the cutout 64b may be formed on opposite sides of the card-side thermal contact 59 in the width direction of the card-type storage device 5B. In this case, the card-side power supply contact 58a may be arranged adjacent to the card-side thermal contact 59 with the cutout 64b provided therebetween.

In the card-type storage device 5B according to the third embodiment as well, similar to the card-type storage device 5 according to the first embodiment, it is possible to ensure sufficient thermal connection and electrical connection in the state in which the card-type storage device 5B is mounted in the slot. This makes it possible to suppress a rise in the temperature of signal lines for high-speed communication that requires impedance control and the like of the card-type storage device 5B, thereby making it possible to accurately perform transmission and reception of signals by high-speed communication.

While the present invention has been described with reference to exemplary embodiments, it is to be understood that the invention is not limited to the disclosed exemplary embodiments. Further, the embodiments of the present invention are described only by way of example, and it is possible to combine the embodiments on an as-needed basis. For example, although in the above-described embodiments, a storage device as a type of a storage system has been described as the card-type electronic device, this is not limitative, but the card-type electronic device according to the present invention can be applied to a device functioning as an interface with an external apparatus, a device functioning as a network device, and a device functioning as a multimedia device. Further, the electronic apparatus on which the card-type electronic device can be mounted can be applied to not only image pickup apparatuses and personal computers but also to printers and MFPs (multi-function printers), for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 1 camera body
5, 5A, 5B card-type storage device
25 host controller
31 slot
41 slot-side substrate 42 slot base
43 slot-side electrical contact
43a slot-side power supply contact
43b slot-side general-purpose communication contact
43c slot-side high-speed communication contact
44 slot-side thermal contact
58 card-side electrical contact
58a card-side power supply contact
58b card-side general-purpose communication contact
58c card-side high-speed communication contact
59 card-side thermal contact
61 card-side connector
62 card frame body
64 card-side substrate
65a to 65d flash memory IC
69 controller IC
70 potting material

The invention claimed is:

1. A card-type electronic device comprising:
a substrate on which electronic components that generate heat are mounted; and
a connector fixed to the substrate, the connector including electrical contacts electrically connected to an external apparatus and a thermal contact thermally connected to the external apparatus,
wherein the substrate has a cutout formed therein at a location between a portion of the substrate to which the thermal contact is fixed and a portion of the substrate to which the electrical contacts are fixed,
wherein the electrical contacts further include power supply contacts for supplying power to the electronic components, general-purpose communication contacts for performing communication not requiring high-speed communication, and high-speed communication contacts for performing high-speed communication, and
wherein the thermal contact, the power supply contacts, the general-purpose communication contacts, and the high-speed communication contacts are sequentially arranged in the mentioned order from an end of the connector in the longitudinal direction to a central portion of the connector in the longitudinal direction.

2. The card-type electronic device according to claim 1, wherein the substrate has an approximately rectangular shape, and
wherein the connector has an elongated shape, and is fixed to the substrate such that a longitudinal direction thereof extends along one side of the substrate.

3. The card-type electronic device according to claim 2, wherein grounds for connecting the electronic components and the electrical contacts on the substrate are electrically connected to the high-speed communication contacts.

4. The card-type electronic device according to claim 2, wherein a distance from an end face of the one side of the substrate to a base of the cutout is longer than a distance from the end face of the one side of the substrate to an extremity of each electrical contact and a distance from the end face of the one side of the substrate to an extremity of the thermal contact.

5. The card-type electronic device according to claim 1, wherein the thermal contact comprises thermal contacts provided at two opposite ends of the connector in the longitudinal direction.

6. The card-type electronic device according to claim 1, wherein a wiring width of a ground for electrically connecting each electronic component and the thermal contact on the substrate is wider than a wiring width of each of grounds for connecting the electronic components and the electrical contacts.

7. The card-type electronic device according to claim 1, wherein the thermal contact is held on the connector via a material having a thermal insulating property.

8. A slot into which and from which a card-type electronic device is inserted and removed, the card-type electronic device including a substrate on which electronic components that generate heat are mounted, and a connector fixed to the substrate, the connector including electrical contacts electrically connected to an external apparatus and a thermal contact thermally connected to the external apparatus,
wherein the substrate has a cutout formed therein at a location between a portion of the substrate to which the thermal contact is fixed and a portion of the substrate to which the electrical contacts are fixed, the slot comprising:
a slot base including electrical contacts and a thermal contact connected to the electrical contacts and the thermal contact of the card-type electronic device, respectively; and
a substrate to which the slot base is fixed,
wherein the electrical contacts of the card-type electronic device further include power supply contacts for supplying power to the electronic components, general-purpose communication contacts for performing communication not requiring high-speed communication, and high-speed communication contacts for performing high-speed communication,
wherein the thermal contact, the power supply contacts, the general-purpose communication contacts, and the high-speed communication contacts of the card-type electronic device are sequentially arranged in the mentioned order from an end of the connector in the longitudinal direction to a central portion of the connector in the longitudinal direction, and
wherein the thermal contact of the slot base and the thermal contact of the card-type electronic device are brought into surface contact with each other, in a state in which the card-type electronic device is inserted into the slot.

9. An electronic apparatus to which a card-type electronic device is mounted, the card-type electronic device including:
a substrate on which electronic components that generate heat are mounted; and
a connector fixed to the substrate, the connector including electrical contacts electrically connected to an external apparatus and a thermal contact thermally connected to the external apparatus,
wherein the substrate has a cutout formed therein at a location between a portion of the substrate to which the thermal contact is fixed and a portion of the substrate to which the electrical contacts are fixed,
wherein the electrical contacts of the card-type electronic device further include power supply contacts for supplying power to the electronic components, general-purpose communication contacts for performing communication not requiring high-speed communication, and high-speed communication contacts for performing high-speed communication, and
wherein the thermal contact, the power supply contacts, the general-purpose communication contacts, and the high-speed communication contacts of the card-type electronic device are sequentially arranged in the mentioned order from an end of the connector in the longitudinal direction to a central portion of the connector in the longitudinal direction; and the electronic apparatus including:
   a slot into which and from which the card-type electronic device is inserted and removed; and
   a control unit configured to control communication between the electronic apparatus and the card-type electronic device mounted in the slot.

* * * * *